United States Patent [19]

Spain et al.

[11] 3,806,900

[45] Apr. 23, 1974

[54] MULTIPLEXING SYSTEM FOR THIN FILM MAGNETIC PROPAGATION CHANNELS

[75] Inventors: Robert J. Spain, Waban; Harvey I. Jauvtis, Arlington, both of Mass.

[73] Assignee: Cambridge Memories, Inc., Newton, Mass.

[22] Filed: May 1, 1972

[21] Appl. No.: 248,812

[52] U.S. Cl. .................... 340/174 FB, 340/174 MC

[51] Int. Cl. ........................ G11c 11/14, G11c 19/00

[58] Field of Search ................ 340/174 FB, 174 MC

[56] References Cited

UNITED STATES PATENTS

| | | | |
|---|---|---|---|
| 3,656,126 | 4/1972 | Jauvtis | 340/174 FB |
| 3,438,016 | 4/1969 | Spain | 340/174 FB |
| 3,562,722 | 2/1971 | Jauvtis | 340/174 FB |

*Primary Examiner*—Stanley M. Urynowicz, Jr.
*Attorney, Agent, or Firm*—John A. Lahive, Jr. Esq.

[57] ABSTRACT

A magnetic device employing domain tip propagation in assemblies which include a number of shift registers within a single propagation drive coil. A single data write in line can control the introduction of domains of reverse magnetization into the input sections of all of the shift register channels within a coil. Similarly a single sensing line can sense the propagation of domains of reverse magnetization through the output sections of all of the shift registers within the coil. A high speed transfer in and transfer out rate is achieved by employing multiplexing selector lines, one for each shift register within the coil, to select within each period of drive propagation each shift register channel in sequence for write in operations and for readout operations. The presence or absence of currents in the selector coils either inhibits or allows propagation of domains of reverse magnetization through selected shift register channels and thereby effects a multiplexing action where, for a drive propagation pulse of duration $\tau$, each shift register has data transferred in or out for a time equal to or less than $\tau/N$, where N is the number of shift registers included within a coil.

14 Claims, 12 Drawing Figures

MULTIPLEXING SYSTEM FOR THIN FILM MAGNETIC PROPAGATION CHANNELS

FIELD OF THE INVENTION

This invention relates in general to magnetic film devices employing domain tip propagation channels and more particularly to a system for multiplexing a number of these channels using common drive electronics.

BACKGROUND OF THE INVENTION

In domain tip propagation, a narrow channel of relatively low magnetic coercivity is formed in a film of anisotropic ferromagnetic material which otherwise exhibits a relatively high magnetic coercivity. A small lenticular shaped domain of reverse magnetization is nucleated at a specific location in the channel by the application of a relatively high localized magnetic switching field. This domain is cuased to propagate along the long axis of the lentil by the application of an intermediate magnitude switching field having the polarity which favors the reverse magnetization within the domain.

Magnetic devices employing this technique for the construction of logic elements and shift registers are described in U.S. PAT. Nos. 3,438,006, 3,438,016 and 3,562,722, and in the commonly assigned and co-pending U.S. patent application Serial No. 248,813 of Robert J. Spain for Magnetic Thin Film Shift Register Having Bidirectional Transmission Elements And Alternatively Paired Block Sites filed concurrently herewith, and the commonly assigned and co-pending U.S. patent application Ser. No. 249,082 of Harvey I. Jauvtis for Magnetic Thin Film Shift Register Having Bidirectional Transmission Elements And Offset Block Sites filed concurrently herewith.

When elements of the type described in those patents and applications are employed in a large capacity system, such as a memory system, it is important to maintain the cost of propagating each bit as low as possible while retaining high performance characteristics. One technique which would be desirable to limit the cost of drive electronics and electrode construction would be to include as many parallel propagation channels within each drive coil as possible. However, in order to obtain the relatively high transfer rates for data write in and read out, the duration of the propagation drive pulse would have to be short, yet inductances associated with the large drive coil limit the effective pulse widths. An additional problem arises from the lack of sufficient signal at the output of the devices when a short drive pulse is used, since there is insufficient time for full fan out of the output magnetic domains by domain multiplication to provide large output signals.

While higher speed operation can be obtained by providing separate drive coils and electronics assoicated with each channel, and separate sense coils and related electronics, the bit cost is significantly increased by such an arrangement, while the bit density is decreased.

SUMMARY OF THE INVENTION

Broadly speaking, in the present invention a large capacity system can be constructed by including a plurality of shift register channels, for example four, within a single drive coil, and utilizing a single data write in line and a single sensing line for all four channels. The propagation drive signals are applied to this drive coil for a duration $\tau$ which is slightly longer than the usual propagate duration for conventional channels, the lengthened propagate duration is slightly more than four times the time required for transfer of data into and out of this array of channels on its common write in and common readout lines.

Input multiplexing is achieved by including a series of selector conductors which traverse propagation channels within the drive coil at points where a field created by current in one conductor can either inhibit or allow a domain (depending upon the direction or magnitude of the field), to enter each channel independently. For outut multiplexing, selector conductors can pass in similarly close proximity to a portion of the channels where the field created by passing a current through any one conductor can inhibit or allow a domain to propagate through a region where it can be sensed as an output signal from a signal channel. By appropriately supplying current in a specified sequence to each selector conductor within a single propagation drive pulse applied to the coil, these selector conductors can gate in sequence each of the inputs to the propagation channels one after the other in rapid succession. These pulses applied to the selector lines are only a fraction of the propagation pulse in duration and therefore provide the requisite high speed transfer rate, yet the economies of a single propagation drive coil are achieved. Also, since the propagation field can remain applied for a duration which is several times as long as the data read time for a single register channel, complete fan out of the flux can occur with a resultant increase in domain tip multiplication, and hence increased output signals are made available. In a large capacity memory, there will be many drive coils, each containing a number of shift register propagation channels. For the entire assembly only one set of selector conductors and associated drive electronics need be used to multiplex both the write operation and the read operation. Hence, with the addition of four drivers and two sets of four selector conductors, the total bit capacity is effectively multiplied by four for the entire array, with a corresponding increase in system speed.

DESCRIPTION OF PREFERRED EMBODIMENTS

Figure 1:
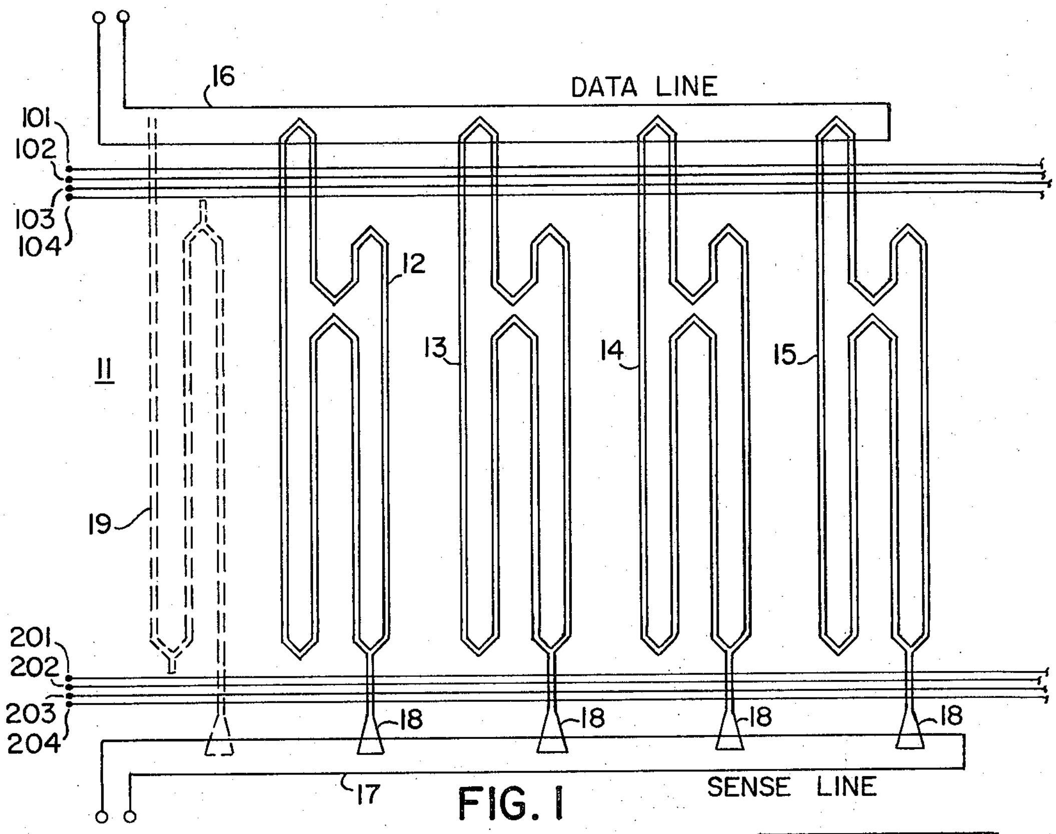
FIG. 1 is an illustration generally in schematic form of a shift register channel and conductor layout embodying the principles of this invention.

With reference now to FIG. 1 there is shown generally in schematic form a set of four separate recirculating domain tip shift register loops. The specific construction details of these shift registers are a matter of the specific design choice. Examples of suitable constructions are disclosed in U.S. Pats. Nos. 3,438,016 and 3,562,722 and in the above referenced copending applications. In general, however, each shift register includes a low coercive force path 12, 13, 14 and 15 respectively, formed within a higher coercivity anisotropic magnetic material 11. FIG. 1 also shows in dashed lines, a non-recirculating shift register having a low-coercivity channel 19 and with which the invention can also be practiced. The drive and erase conductor and whatever format of hold and block conductors are used to control domain propagation within the shift registers, which are not shown in FIG. 1, will have a particular form corresponding to the specific design according to the teachings of the above referred to patents and applications. Data bits are written into each of the shift registers, 12, 13, 14 and 15 by applying a current to the data line 16, which passes over the input ends of the low coercive force channels in a position and with dimensions such that the current can nucleate a small domain of reverse magnetization in order to insert a 1 bit into each register. In an alternative arrangement, the current applied to the data line 16 inhibits domain nucleation. The output from the shift registers is sensed at an output sense line 17 which passes across a series of fan out areas 18 for each of the channels. The sense line inductively senses the change in magnetic flux as the domains of reverse magnetization are propagated past it.

One feature of this invention is the inclusion within these structures of selector lines 101, 102, 103 and 104 which pass adjacent to the input sections of the shift registers 12, 13, 14 and 15. Each of these selector lines is formed of an electrical conductor, typically having a width of 0.003 inches, and passes sufficiently close to the low coercive channel so that a current of suitable magnitude passed through the selector line generates at the channel a magnetic field of sufficient magnitude to either inhibit the propagation of a nucleated domain under the influence of a propagation drive field or to allow the propagation. The operation which each selector line provides depends on its configuration relative to the data line 16 and relative to a register channel, and depends upon the magnitude of the drive field and the direction of the current through the selector line. Similarly, a group of selector lines 201, 202, 203 and 204 traverses the channels 12, 13, 14 and 15 just prior to the fan out sections 18. These output selector lines inhibit or allow propagation of nucleated domains to these sections according to the presence or absence of current in the lines.

The FIG. 1 showing of the configurations of the lines 16, 17, 101, 102, 103, 104, and 201, 202, 203, and 204 relative to each other and to the register channels in only schematic, and not a particular operative arrangement; FIGS. 3–6 show operative forms.

Figure 2:
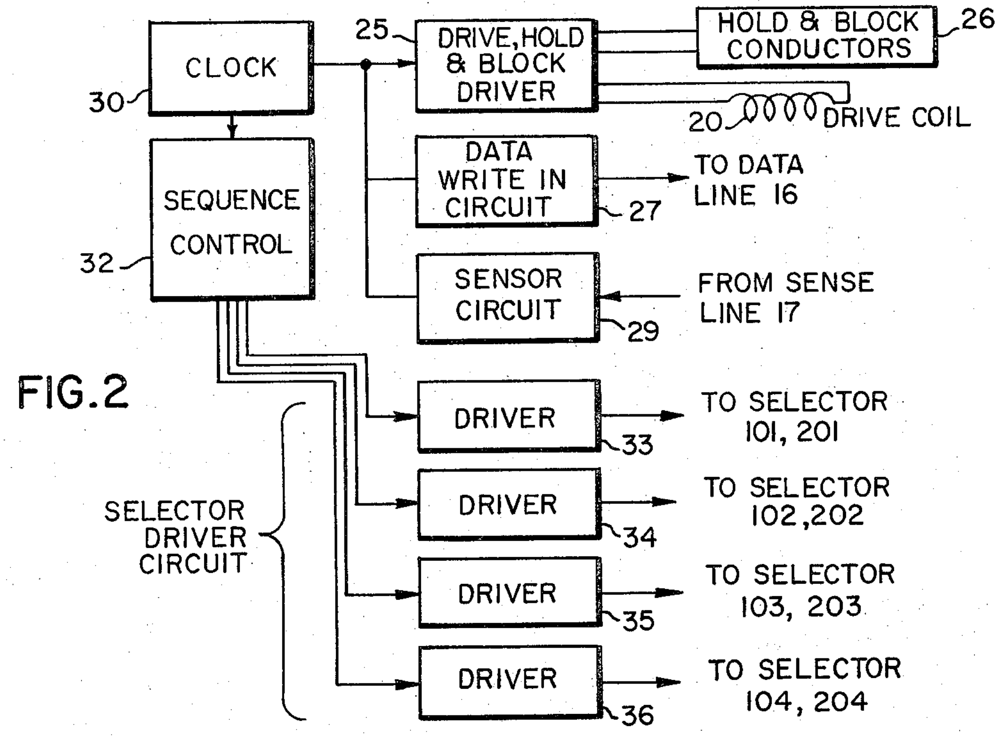
FIG. 2 is an illustration in block diagrammatic form of the drive and control circuit elements for use with the shift register arrangement illustrated in FIG. 1.

The circuitry for operating the shift registers of FIG. 1 is illustrated in block diagrammatic form in FIG. 2. A clock 30 provides timing signals for all of the driver circuits for the shift registers, as well as for the write in circuit and the write out circuit, and thereby controls the basic shift cycles and the sequencing between the operation of each of the elements. A drive, hold and control driver 25 provides current pulses to the drive coil 20 which encloses the four shift register loops 12, 13, 14 and 15, and to the hold and block conductors 26 of the registers. The current supplied from the driver 25 to the coil 20 is sufficient to propagate domains of reverse magnetization along the shift register channels.

A data write in circuit 27 provides current pulses to the data line 16 to insert bits, in the form of nucleated domains of reverse magnetization, into each of the channels when a positive or 1 bit appears on the data stream input. Alternatively, the data line can be used to inhibit domain entry.

A sensor 29 is connected to the sense line 17 and provides sensing circuitry for determining the presence of a bit at the outputs 18 from each of the shift register channels. Typically the sensor circuit 29 includes a strobe circuit so that only at specific times is a determination made of the presence or absence of an output signal.

A series of driver circuits 33, 34, 35 and 36 is connected to the selector lines 101, 102, 103 and 104 respectively and also to selector lines 201, 202, 203 and 204, as designated. Sequence control unit 32 sequences these selector lines to multiplex the data inputs and the data outputs from each of the shift registers in a specific sequence. The detailed explanation of the sequencing arrangement of the driver signals is set forth below.

In operation, the propagate drive signals and the hold and the block signals are used to step information through all four recirculating magnetic loops 12, 13, 14 and 15 simultaneously, in parallel. In the duration, $\tau$, of one propagate pulse, each of the selector lines 101, 102, 103 and 104 is sequentially energized for a time less than one quarter of the total propagate pulse width, $\tau$, so that each transfer time for entering data into one register is roughly only one-fourth the duration of the total propagate pulse. Similarly the output selector lines 201, 202, 203 and 204 are energized in sequence during a propagate pulse so that the output signals from the shift set of four registers are generated at four times the rate of the propagation pulses. Thus the transfer rate of the set of shift registers is approximately four times as fast as it would be with the propagate pulse without these selector lines. Using this approach transfer cycles of 0.5 microseconds have been achieved. Since the propagate drive pulse has a duration more than four times this transfer time for a single register, additional time is provided for fan out of the flux at the output 18 with increased multiplication of the domain tips, and therefore increased output signal is available.

While in FIG. 1 both input sections and output sections are multiplexed by the selector conductors it will be understood that the multiplexing can be arranged to take place at only the input or only the output, with the non-multiplexed section being operated with individual data in lines where only the outputs are multiplexed, and with individual sensing lines when only the inputs are multiplexed.

Figure 3A:
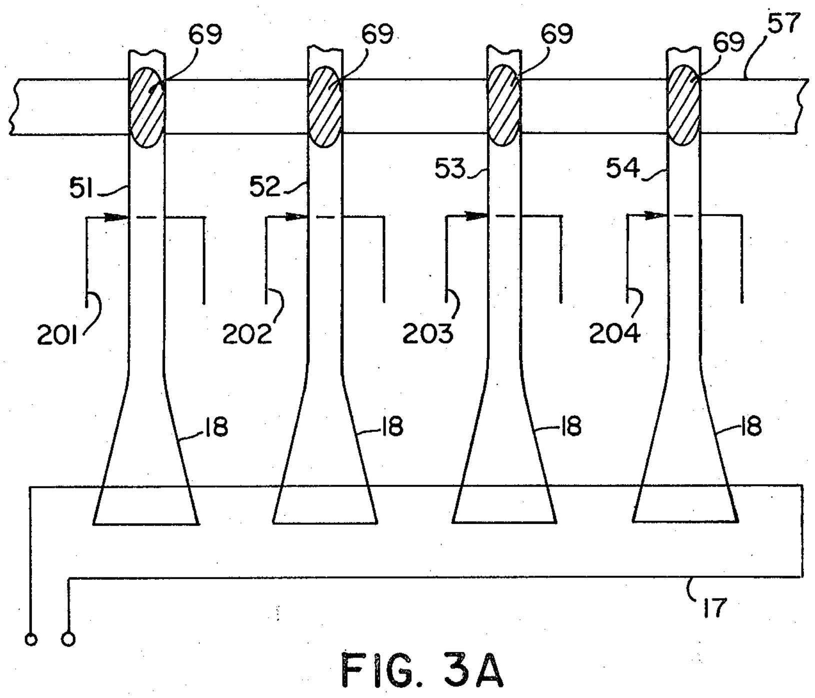
FIGS. 3*a*, 3*b*, 3*c* and 3*d* are illustrations generally in schematic form of a multiplexing conductor arrangement for controlling the readout from a shift register.
Figure 3B:
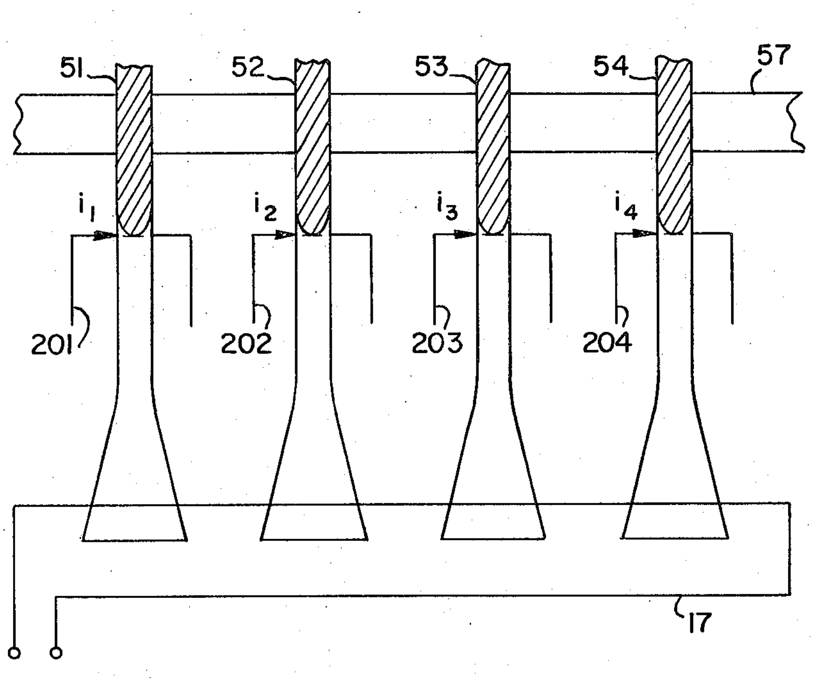
Figure 3C:
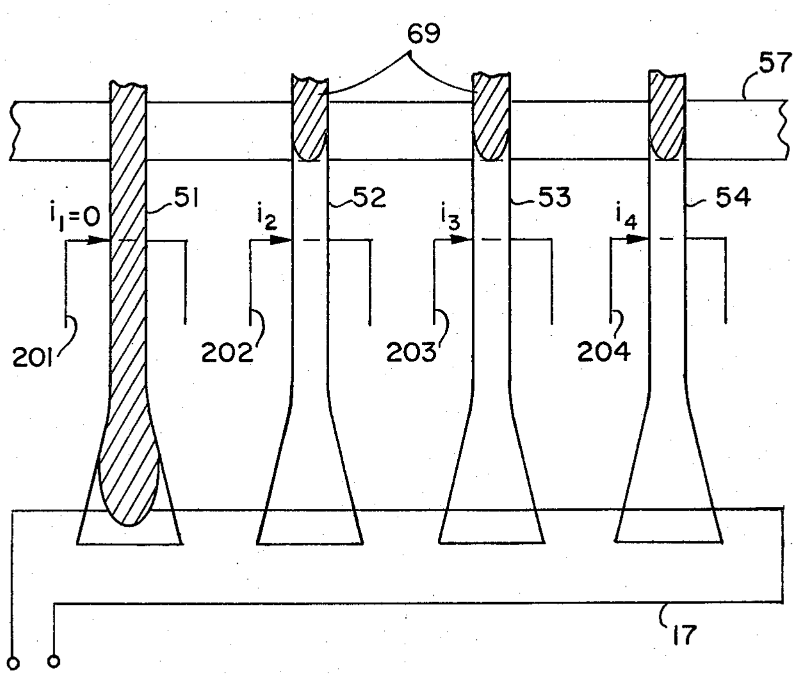
Figure 3D:
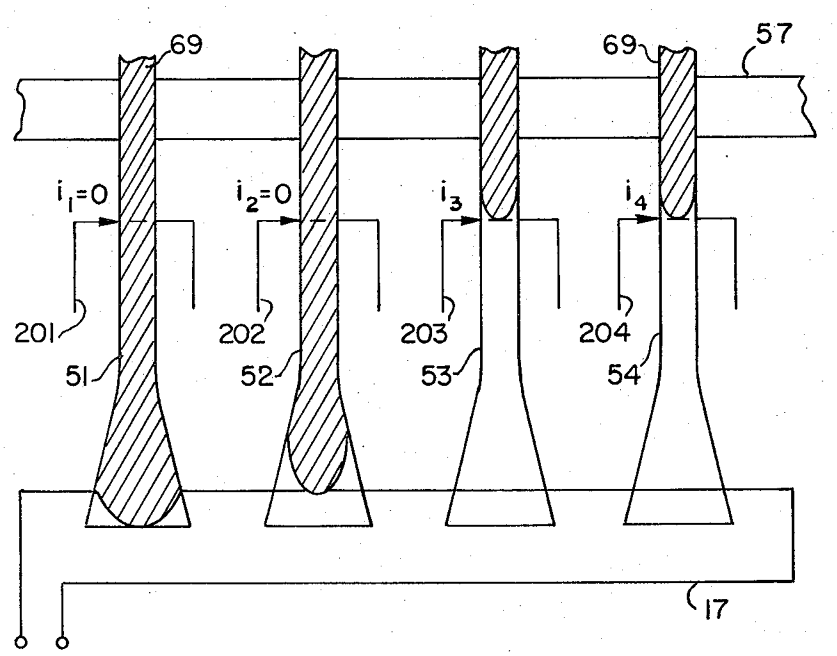

In FIGS. 3*a*, 3*b*, 3*c* and 3*d* there is depicted schematically a specific output multiplexing arrangement for four output channels 51, 52, 53 and 54 from parallel shift registers. These shift registers are of the type described in U.S. Pat. No. 3,562,722 in which propagation through the body of the shift registers is controlled by means of hold lines, one of which is illustrated at 57. In FIG. 3*a*, the status of the domains of reverse magnetization 69 is shown in the condition which exists just prior to the initiation of a propagate drive pulse. Each of the channels 51, 52, 53 and 54 has a respective selector gating line 201, 202, 203 and 204 adjacent to it in the area between the hold line 57 and the output fanning areas 18. In FIG. 3*b* a magnetic drive field has been applied to coil 20 (FIG. 2), propagating the domains 69 in all four channels toward the sense line 17. Each of the selector lines 201, 202, 203 and 204 has a respective current $i_1$, $i_2$, $i_3$ and $i_4$ applied to it and the effect of this current is to generate a field opposing further propagation of the domains along the channel and these currents therefore inhibit the propagated domains from reaching the output sections 18 and being sensed by the sense lines 17. In FIG. 3*c* the current $i_1$ through the selector line 201 is reduced to zero (the drive propagation field being maintained on throughout this entire sequence), while the currents $i_2$, $i_3$ and $i_4$ are maintained in the remainder of the selector lines. Accordingly the domain of reverse magnetization in channel 51 extends into the fan out area and induces a voltage into the output sense line 17. In FIG. 3*d* the selector line 202 has also had its current $i_2$ reduced to zero, allowing the domain of reverse magnetization in channel 52 to expand to the sense line 17, inducing an output signal. The current $i_1$ may be left at zero at this time, as indicated, or the current may again be supplied to line 201 to reduce noise background or to simplify the timing.

To complete the sequence, the currents supplied to selectors 203 and 204 are turned off in similar fashion, allowing the domains in each of these channels to extend to the sensing line 17 one at a time. It should be noted that there is no requirement relating to the order in which each of the channels 51, 52, 53 and 54 is read out, and so that non-adjacent channels can be read out sequentially, provided that they are all read out within the same propagate drive field. Additionally, it should be noted that there can be a large number of subunits, each as illustrated in FIG. 3*a*, so that a relatively high capacity memory system can have a large number of drive coils, each containing, for example, four channels; and yet only four selector lines and associated drive circuits are required for the entire memory.

The foregoing multiplexed output arrangement of FIGS. 3*a*–3*d* can be used with both recirculating registers and with non-recirculating registers, as depicted in FIG. 1.

Figure 4A:
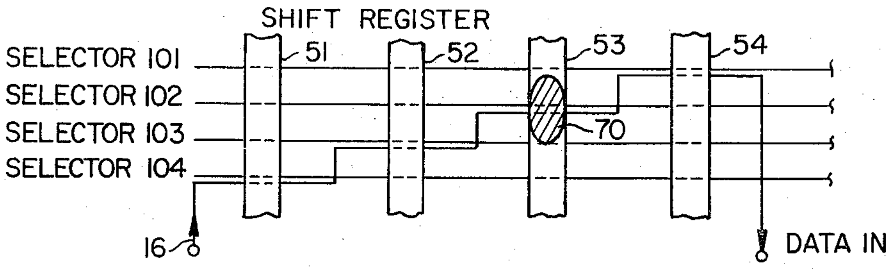
FIG. 4*a* is an illustration generally in schematic form of the input section of a shift register constructed in accordance with the principles of this invention.
Figure 4B:
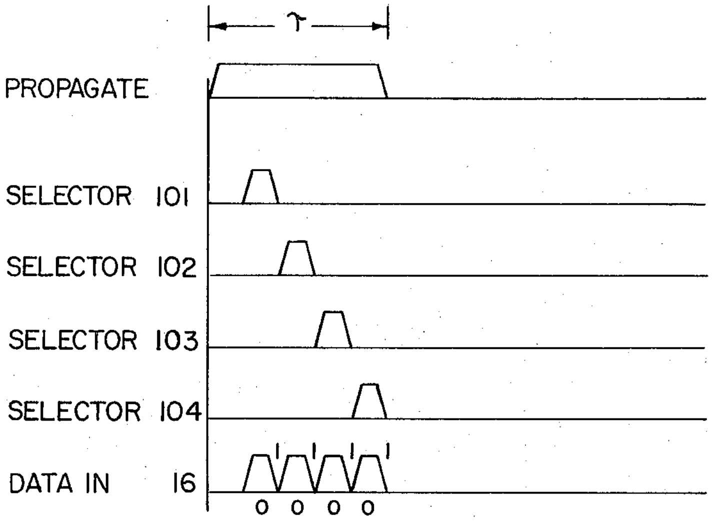
FIG. 4*b* is an illustration of the waveforms of signals to be applied to the shift register input section illustrated in FIG. 4*a;*

In FIGS. 4*a* and 4*b* there is illustrated a configuration for the four channels 51, 52, 53 and 54 at the input section. In the configuration illustrated, a data in line 16 is superimposed upon the selector lines 101, 102, 103 and 104 in a two-layer conductor pattern structure. The data in line 16 is configured to couple a magnetic field into each channel at the same site where only the associated selector line couples a field. Selector lines not associated with a channel do not couple a field into it at the site of the data in field. Nucleation of a domain of reverse magnetization in a single channel is accomplished by simultaneously energizing the data in line 16 and the associated selector line with currents such that the total combined field produced is sufficient to nucleate a domain 70 of reverse magnetization. If the current in either one of the lines is not itself sufficient to nucleate this domain, then a domain is only inserted into a channel 51, 52, 53 and 54 when the data in line 16 is provided with a pulse of current coincident with a pulse of current on the associated one of the selector lines, 101, 102, 103 or 104.

In FIG. 4b a timing diagram for the operation of the input write in for the shift registers is shown. The propagate pulse has a width $\tau$, somewhat greater than four times the width of each of the selector pulses. During the duration $\tau$, data can be inserted into a selected shift register by simultaneously providing a pulse on the associated selector line and on the data in line 16. The current pulses on the selector lines have a duration nominally set at $\tau/N$, where $\tau$ is the propagate duration and N is the number of channels within each drive coil, (N equaling four in the present example). While it is most convenient to have each selector pulse of equal width, the pulse widths may vary, as long as the sum of times for the N pulses does not exceed $\tau$. As indicated in the diagram, a 0 is written into the shift register by allowing the current on the data line 16 to be zero during the time when the one associated selector line has a current pulse on it. Conversely a 1 is written into a channel by applying a current pulse to the data in line 16 simultaneously with the current pulse being applied to the selector line associated with the channel.

While the propagate pulse has been illustrated in FIG. 4*b* as a simple positive drive pulse, it will be understood that in accordance with the teachings of the shift register patents and applications noted above, the propagate pulse is followed by an erase step. The duration $\tau$ is the basic timing duration of each shift register drive propagation, exclusive of other register operating steps such as an erase step. However, as can been seen, the write in or transfer in period from a single data in line 16 is almost four times as fast as this basic shift register drive time. While four selector lines operating four channels within a single propagate coil 20 have been illustrated as a specific example, it should be understood that a larger number may be included and operation has been carried out with up to eight channels within a single propagate coil.

The arrangement of FIGS. 4*a* and 4*b* preferably is used with he non-recirculating type register 19 of FIG. 1. It generally is useful with recirculating registers only when additionally provided with a block conductor or the like for selectively inhibiting a domain already in any register channel from advancing past the input section.

Figure 5A:
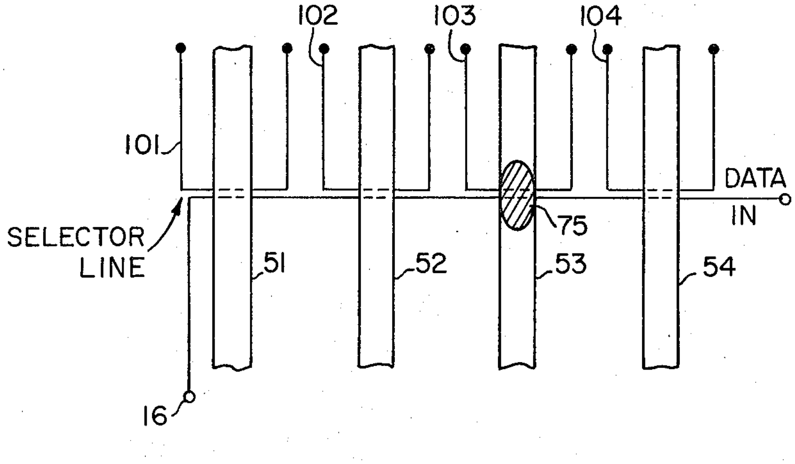
FIG. 5*a* is an illustration generally in schematic form of a second embodiment of a shift register input section read out system constructed in accordance with the principles of this invention.
Figure 5B:
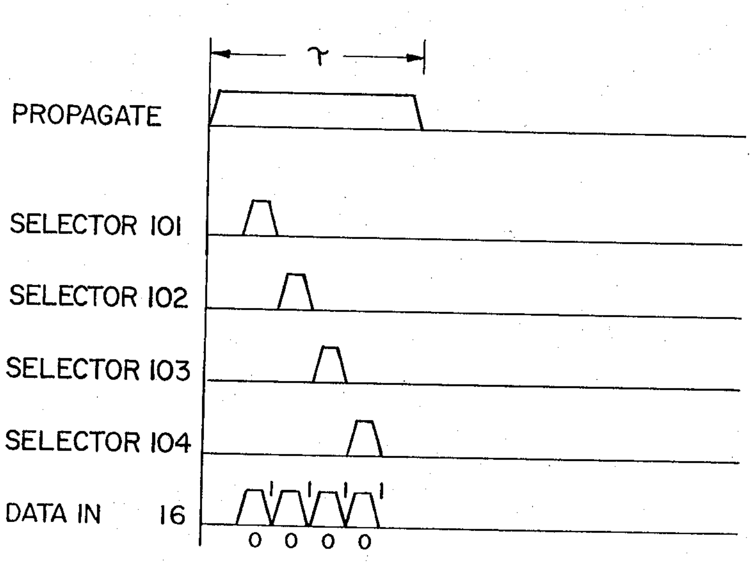
FIG. 5*b* is an illustration of the waveforms suitable for operating the shift register input section of FIG. 5*a;*

In FIGS. 5*a* and 5*b* an alternative embodiment for writing in data with multiplexing lines is illustrated. In this configuration the data in line 16 and the selector lines are again superimposed. Each selector line crosses only a single channel, but at the same site as the data in line, which is common to all channels. In this configuration the current pulses through select lines 101, 102, 103 and 104 are sufficient themselves to cause nucleation of reverse domain magnetization in its associated channel. However, a current pulse in the data in line 16 generates a field in a direction to inhibit nucleation of such a domain. Thus to write a 0 into a specific channel a current pulse on the data in line 16 is arranged to coincide with or otherwise be present for as long as the current pulse on the selector line associated with that channel. The timing diagram for this type of write in operation is illustrated in FIG. 5*b*. The input section arrangement of FIGS. 5*a* and 5*b* again is generally more useful with non-recirculating registers, as discussed above with reference to FIGS. 4*a* and 4*b*.

Figure 6A:
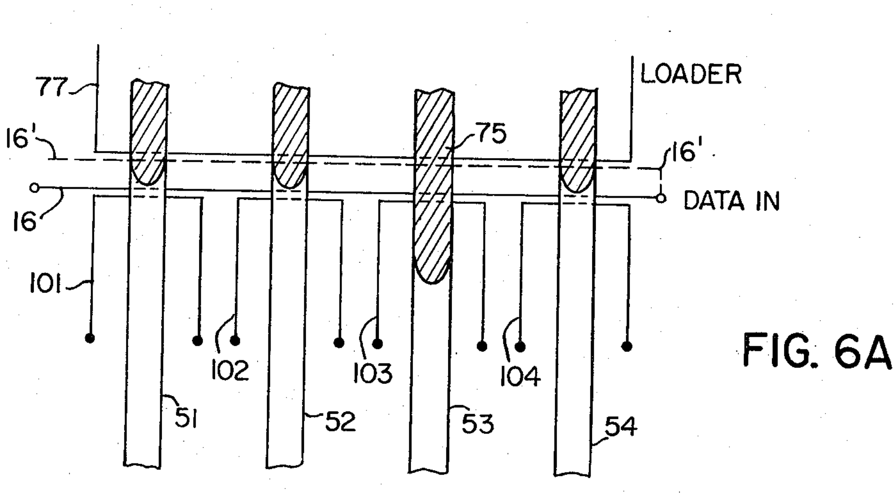
FIG. 6*a* is an illustration generally in schematic form of a third embodiment of a shift register input section constructed in accordance with the principles of this invention.
Figure 6B:
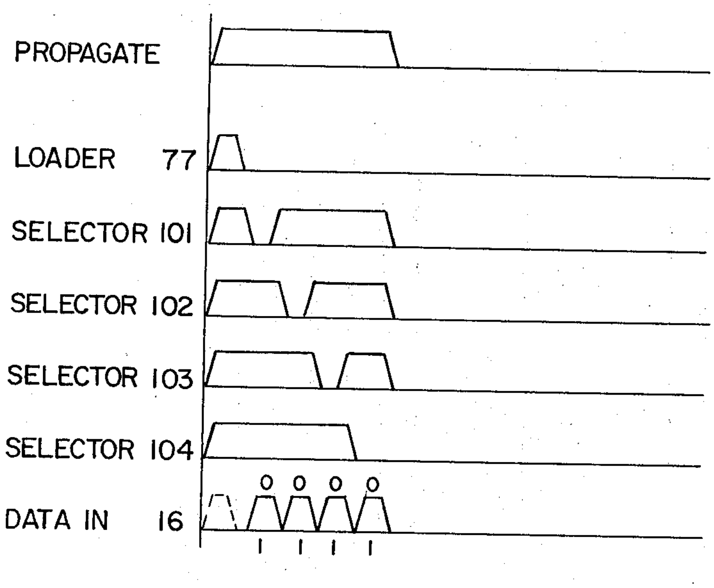
FIG. 6*b* is an illustration of suitable waveforms for operating the shift register input section of FIG. 6*a*.

A third configuration for entering data into parallel shift registers using the multiplex technique is illustrated in FIGS. 6*a* and 6*b*. In this configuration, in addition to the selector lines 101, 102, 103 and 104, the register includes a loader line 77 which is positioned nearer to the input of the channels than the data in line 16 and than the selector lines 101, 102, 103 and 104. This line 77 receives a pulse of sufficient current to nucleate domains 75, FIG. 6*a*, in each of the four channels. In order for the domains so nucleated to enter into a shift register channel, the current in the associated selector line and the data in line current must simultaneously be off during the portion of the propagate duration $\tau$ assigned to that register. The timing diagrams for this type of operation are illustrated in FIGS. 6*b*. Thus during the initial stage of the propagate duration $\tau$, the loader line 77 is energized, nucleating domains 75 of reverse magnetization in each of the low coercive force channels 51, 52, 53 and 54. Each selector line is energized during this initial stage. The selector lines are then de-energized one at a time for only short periods approximately equal to $\tau/4$ in progressive sequence after the completion of this nucleating pulse on the loader line 77. In order to write in a positive 1 bit in a specific channel, the current on data in line 16 must be reduced to zero at the time coincident with zero current window in the associated selector line.

In the configuration of FIG. 6*a*, it is possible to eliminate the loader line 77 if each selector line 101, 102, 103 and 104 is physically arranged to return in such a way as to cause nucleation of a domain in the appropriate location. This latter technique requires turning on all of the data in currents at the time when the loader line 77 current pulse would normally be on. Another alternative is to eliminate the loader line and replace it with a return segment 16' of the data in line, as shown with dashed lines in FIG. 6*a*. The nucleate pulse otherwise applied to the loader line is instead applied to the data in line as shown dashed in FIG. 6*b*.

All of these arrangements described with reference to FIGS. 6*a* and 6*b* can be used with both recirculating and non-recirculating registers, i.e., with the FIG. 1 registers 12, 13, 14 and 15 and with registers of the type of register 19.

There are a number of suitable configurations for the various embodiments described above. In order to simplify the number of conductor planes and interconnections required, the selector lines may be strung through all four shift registers while still allowing each individual shift register to be accessed in sequence. In such an arrangement all four selector lines would pass through the first shift register loop physically displaced from one another. Three of these selector lines would also pass through the next shift register loop, while the omitted ones would bypass the remainder of the shift register loops in that sub-set. Similarly only two selector lines would pass through the third shift register loop and only one through the final shift register loop. All of the lines would then be regrouped for wiring through the next sub-set of four shift register loops. Where this approach is used for writing in, then the data in line would have a physical configuration as illustrated in FIG. 4*a*, in which the data in line 16 follows a generally staircase formation running adjacent to one of the selector lines for one channel and adjacent to another one of the selector lines for the next channel and so on. Thus for coincidence write in techniques the only channel affected is the one in which there is a conjunction of both the data in line and the selector line. In the read out configurations, the staircase formation is not required, once a channel has been read out continued actuation of that selector line produces no further result.

The multiplexing technique described herein has been utilized with the domain tip shift registers for transfer rates as high as one megahertz with a domain shift speed in the order of 1/N this transfer rate, where N equals the number of channels in each set thereof operated by a common drive coil. Since the propagate drive current is on for slightly longer than the total time utilized to write in or read out from all of the shift register loops, this time provides for fan out of the flux for the next set of data bits to be read, allowing large signals to be readily achieved. Additionally, increases in rise and fall times of the driving pulses has less of an effect on the transfer rate since any increase in dead time is reduced by a factor of N for each bit.

We claim

1. In a magnetic device including, a plurality of channels of low coercive force within a magnetic medium having an initial state of magnetization in a first direction and means for producing a domain of reversed magnetization within each of said channels and means for propagating said produced domain of reversed magnetization during an actuation period $\tau$, the improvement comprising, a plurality of selector conductors, each associated with and positioned in operative proximity to at least one of said plurality of channels, and means for selectively applying electrical currents to said selector conductors in a predetermined sequence during a single actuation period, $\tau$ of said means for propagating said reverse domain, the positioning of each of said selector conductors relative to its associated channel and magnitude of said applied current being such that the propagation of said reverse domains in each of said channels is selectively allowed or inhibited according to the presence or absence of current in the conductor associated with the respective channel.

2. The improvement in accordance with claim 1 wherein each selector conductor is arranged to inhibit propagation in the associated channel during the period current is applied to it.

3. The improvement according to claim 1 wherein each conductor is arranged to allow propagation in the associated channel during the period current is applied to it.

4. A magnetic device comprising, an assembly of a non-unitary number, N, of magnetic domain tip shift registers, each of said shift registers including an input section formed of a low coercivity channel within a magnetic medium of higher coercivity and an output section formed of a low coercivity channel within a magnetic medium of higher coercivity, means for generating a magnetic propagation drive field for periods of predetermined duration, τ, simultaneously for all of the shift registers within said assembly, a data in conductor coupled to a source of current signals representing an input data stream, said data in conductor passing adjacent to the input section of each of the shift registers within said assembly, a sensing means adjacent to the output section of each of the shift registers within said assembly and providing an output signal for each shift register output section whenever a domain of reverse magnetization is propagated within a channel, thereof, a plurality of selector conductors each positioned adjacent to the input section of a different associated one of said shift registers, and means for selectively applying electrical currents to said selector conductors in a predetermined sequence within a single period τ when said generating means applies said propagating field to said shift registers, the positioning of said selector conductors relative to said associated input sections and the magnitude of said applied currents being such that the propagation of domains of reverse magnetization through said input section in each of said shift registers is allowed or inhibited according to the presence or absence of current in the selector conductor associated with that input section during the application of said propagating field.

5. A device in accordance with claim 4 wherein said means for selectively applying electrical currents to said selector conductors provide said current with a specified magnitude to any one or more of said selector conductors during each period of drive propagation, τ, for a time $\leq \tau/N$ , said selector conductors and said data in conductor being arranged such that the coincidence, at the input section of any shift register, of a current signal from said input data stream on said data in conductor and said specified magnitude of current on the adjacent selector conductor nucleates a domain of reverse magnetization within the channel of said input section and propagates said domain into that shift register.

6. A magnetic device in accordance with claim 4 wherein said means for selectively applying electrical currents to selector conductors applies current for periods $\geq \tau/N$ , the magnitude of current supplied on a selector conductor being sufficient to nucleate a domain of reverse magnetization in the adjacent input section channel and wherein said selector conductors and said data in conductor are arranged with respect to said input section channels such that the presence of a current signal on said data in conductor from said source of current signals inhibits the propagation of a nucleated domain along any of said input section channel.

7. A magnetic device in accordance with claim 4 and further including a load line conductor passing adjacent to each of said input section channels and means for applying current to said load line during an initial portion of a propagate drive period, τ, to nucleate domains of reverse magnetization in each of said input section channels, said means for applying electrical currents to said selector conductors providing currents to said conductors such that during each portion of a drive propagation period which follows after the portion during which said load line conductor has current applied to it, each of said selector conductors in sequence has current removed from it for periods $\geq \tau/N$, and wherein said selector conductors and said data in conductor are arranged such that domains of reverse magnetization nucleated in the input section channels are propagated along said channels only during the $\tau/N$ period when current has been removed from the adjacent selector conductor coincides with the absence of current on said data in conductor.

8. A magnetic device in accordance with claim 7 wherein said load line is formed from the return line of said selector conductors.

9. A magnetic device comprising, an assembly of a number non-unitary, N, of magnetic domain tip shift registers, each of said shift registers including an input section formed of a low coercivity channel within a magnetic medium of higher coercivity and an output section formed of a low coercivity channel within a magnetic medium of higher covercivity, means for generating a magnetic propagation drive field for periods of predetermined duration, τ, simultaneously for all of the shift registers within each assembly, data input means coupled to a source of current signals representing an input data stream, said data input means being coupled to the input sections of each of the shift registers within said assembly, a sensing line passing adjacent to the output sections of each of the shift registers within said assembly and providing output signals whenever the propagation of domains of reversed magnetization within the channels included in each shift register output section induces an electrical signal within said sensing line, a plurality of selector conductors each positioned adjacent to the output section one of said shift registers, means for selectively applying electrical currents to said selector conductors in a predetermined sequence during a single period τ when said means propagating field is applied to said shift registers, the positioning of said selector conductors and the magnitude of said applied currents being such that the propagation domains of reverse magnetization through said output section in each of said shift registers is allowed or inhibited according to the presence or absence of current in the selector conductor positioned adjacent to the respective shift register input section.

10. A magnetic device in accordance with claim 9 wherein the positioning of said selector conductors and magnitude of the electrical currents applied thereto are such that domains of reverse magnetization within each shift register are inhibited from passing to the respective output sections whenever current is applied to the adjacent selector conductor.

11. A magnetic device comprising, an assembly of a number, N, of magnetic domain tip shift registers, each of said shift registers including an input section formed of a low coercivity channel within a magnetic medium of higher covercivity and an output section formed of a low coercivity channel within a magnetic medium of higher coercivity, means for generating a magnetic propagation drive field for periods of predetermined duration, $\tau$, simultaneously for all of the shift registers within each assembly;

a data conductor coupled to a source of current signals representing an input data stream, said data in conductor passing adjacent to the input sections of each of the shift registers within said assembly;

a sensing line passing adjacent to the output sections of each of the shift registers within said assembly and providing output signals whenever the propagation of domains of reverse magnetization within the channels included in each shift register output section induces an electrical signal within said sensing line;

a first plurality of selector conductors each positioned adjacent to the input section one of said shift registers, a second plurality of selector conductors each positioned adjacent to the output section of one of said shift registers; and means for selectivly applying electrical currents to said selector conductors in a predetermined sequence in the periods said means propagating field is applied to said shfit registers, the positioning of said selector conductors and the magnitude of said applied currents being such that the propagtion of domains of reverse magnetization through said input section in each of said shift registers is allowed or inhibited according to the presence or absence of current in the selector current positioned adjacent to the respective shift register input section.

12. A magnetic device in accordance with claim 11 wherein said plurality of selector conductors are arranged with respect to said input section channels such that the application of electrical current to any one of said first plurality of selector conductors inhibits the propagation of a domain of reverse magnetization through the input section channel adjacent to said conductor and wherein said second plurality of selector conductors are positioned with respct to said output sections such that the application of a current to any one of said second plurality of selector conductors inhibits the propagation of a domain of reverse magnetization from the shift register to the respective output section adjacent to that selector conductor.

13. A magnetic device in accordance with claim 11 wherein said first plurality of selector conductors are positioned such that the application of an electrical current to any one of said selector conductors allows the propagation of a domain of reverse magnetization through said input section adjacent to said conductor and into the respective shift register, and wherein said second plurality of selector conductors are positioned such that the application of an electrical current to any one of said second plurality of selector conductors inhibits the propagation of a domain of reverse magnetization from the respective shift register through the output section adjacent to that selector conductor.

14. A magnetic device in accordance with claim 13 wherein domains of reverse magnetization are nucleated in an input section channel only when current is applied to the adjacent one of said first plurality of selector conductors in coincidence with a current signal from said source of current signals being applied to said data in conductor.

* * * * *

UNITED STATES PATENT OFFICE

CERTIFICATE OF CORRECTION

Patent No. 3,806,900 Dated April 23, 1974

Inventor(s) Robert J. Spain and Harvey I. Jauvtis

It is certified that error appears in the above-identified patent and that said Letters Patent are hereby corrected as shown below:

Column 1, line 20 reading

"field. This domain is cuased to propagate along the long"

should read

-- field. This domain is caused to propagate along the long--;

Column 1, lines 56 and 57 reading

"providing separate drive coils and electronics as-soicated with each channel, and separate sense coils"

should read

--providing separate drive coils and electronics associated with each channel, and separate sense coils--;

Column 10, line 21 reading

"an assembly of a number non-unitary, N, of magnetic"

should read

--an assembly of a non-unitary number, N, of magnetic--;

UNITED STATES PATENT OFFICE

CERTIFICATE OF CORRECTION

Patent No. 3,806,900 Dated April 23, 1974

Inventor(s) Robert J. Spain and Harvey Il Jauvtis

It is certified that error appears in the above-identified patent and that said Letters Patent are hereby corrected as shown below:

Column 11, line 30 reading

"is applied to said shfit registers, the positioning of"

should read

--is applied to said shift registers, the positioning of--;

Column 11, line 32 reading

"applied currents being such that the propagtion of"

should read

--applied currents being such that the propagation of--;

Column 12, line 10 reading

"conductors are positioned with respct to said output"

should read

--conductors are positioned with respect to said output--.

Signed and sealed this 1st day of October 1974.

(SEAL)
Attest:

McCOY M. GIBSON JR.
Attesting Officer

C. MARSHALL DANN
Commissioner of Patents